United States Patent [19]

Fu

[11] Patent Number: 4,909,439

[45] Date of Patent: Mar. 20, 1990

[54] MINI TYPE FUEL INJECTOR

[75] Inventor: Shih-Lien Fu, Hsing Chu Hsien, Taiwan

[73] Assignee: Industrial Technology Research Institute, Hsing Chu Hsien, Taiwan

[21] Appl. No.: 174,706

[22] Filed: Mar. 29, 1988

[51] Int. Cl.⁴ ............................................ F16K 31/02

[52] U.S. Cl. ..................................... 239/585; 239/489

[58] Field of Search ................ 239/585, 533.3, 533.11, 239/464, 489

[56] References Cited

U.S. PATENT DOCUMENTS

| | | | |
|---|---|---|---|
| 3,224,684 | 12/1965 | Roosa | 239/533.11 |
| 3,967,597 | 7/1976 | Schlagmüller | 239/585 X |
| 4,060,199 | 11/1977 | Brüne et al. | 239/585 X |
| 4,231,525 | 11/1980 | Palma | 239/585 |
| 4,651,931 | 3/1987 | Hans et al. | 239/585 X |
| 4,662,567 | 5/1987 | Knapp | 239/585 |

*Primary Examiner*—Andres Kashnikow

*Attorney, Agent, or Firm*—Morton J. Rosenberg; David I. Klein

[57] ABSTRACT

This invention relates to a mini type fuel injector and in particular to one including a stator provided at the outer surface with a flange dividing the stator into a first portion and a second portion, an adjusting pipe slidably disposed within the hole of the second portion of the stator, a bobbin mounted on the second portion of the stator with its one end bearing against the flange and its the other end extending out of the second portion and wrapped with insulated wires to form a coil, a housing having an inner reduced neck supporting a lower end of the coil and joined together with the stator by rivetting, a socket arranged in the flange of the stator, an armature received between the stator, the bobbin and the housing, a valve body having a flange for connecting the housing by rivetting and a compression spring with two ends thereof urging against the adjusting pipe and the armature, whereby the construction is simplified and the magnetic flux path is reduced thereby speeding up the dynamic response, devaluating the low-end linearity as the providing desirable atomizing effect.

3 Claims, 3 Drawing Sheets

MINI TYPE FUEL INJECTOR

BACKGROUND OF THE INVENTION

It is the common researching purpose to devaluate the low-end linearity, increase the speed of the dynamic response, enlarge the injection dynamic range and raise the running speed of the engine for the fuel injector of the gasoline engine. In order to meet the need for the gasoline of high speed engine, not only the dynamic response of the gasoline fuel injector should be sped up but also the dynamic flow range has to be enlarged. However, all kinds of fuel injector on the market cannot provide such satisfactory results.

It is, therefore, an object of the present invention to provide a fuel injector which may reduce the volume of the valve thereby decreasing the length of the magnetic flux path and therefore decreasing magnetic resistance. Furthermore, the present invention has a lighter valve needle and omits two oil ring so that the construction is simplified.

Table 1 shows the testing results of the present invention in comparison with the known injectors. As illustrated, the dynamic response of the fuel injector according to the present invention opening time delay is 0.67 ms and closing time delay is 0.48 ms and the low-end linearity is dropped to 0.7 ms, which are much lower than those of the prior art. Hence, it is possible for the present injector to have atomized gasoline of very small particles for combustion and so the outlet of the injector will not be deposited by carbon even if having runned for a long period, thereby keeping steady supply of gasoline, increasing combustion efficiency and lowering gasoline consumption and air pollution.

TABLE 1

| ITEM INJECTOR | VALVE NEEDLE WEIGHT(g) | LOW-END LINEARITY(ms) | DYNAMIC REACTION(ms) OPENING TIME DELAY | DYNAMIC REACTION(ms) CLOSING TIME DELAY |
|---|---|---|---|---|
| COMMONLY USED INJECTOR A | 3.0 | 0.95 | 0.95 | 0.70 |
| COMMONLY USED INJECTOR B | 2.0 | 1.20 | 1.03 | 0.70 |
| COMMERCIALIZED INJECTOR | | | | |
| EV1.1A | 4.3 | | 1.55 | 0.89 |
| EV1.3A | 4.3 | | 1.49 | 0.72 |
| EV1.4A | 2.7 | | 1.32 | 0.55 |
| THE PRESENT INVENTION | 1.4 | 0.7 | 0.67 | 0.48 |

SUMMARY OF THE INVENTION

This invention relates to an improved mini type fuel injector.

It is the primary object of the present invention to provide a mini type fuel injector which has reduced magnetic flex path so that the dynamic response may be sped up and the low-end linearity may be devaluated.

It is another object of the present invention to provide a mini type fuel injector which may provide a desirable atomizing effect to the gasoline for combustion.

It is still another object of the present invention to provide a mini type fuel injector which may provide a high combustion efficiency.

It is still another object of the present invention to provide a mini type fuel injector which may reduce gasoline consumption.

It is a further object of the present invention to provide a mini type fuel injector which has lesser air pollution.

The novel features which are characteristics of the invention, together with further objects and advantages thereof will be better understood from the following description considered in connection with the accompanied drawings and in which two preferred embodiments of the invention are illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
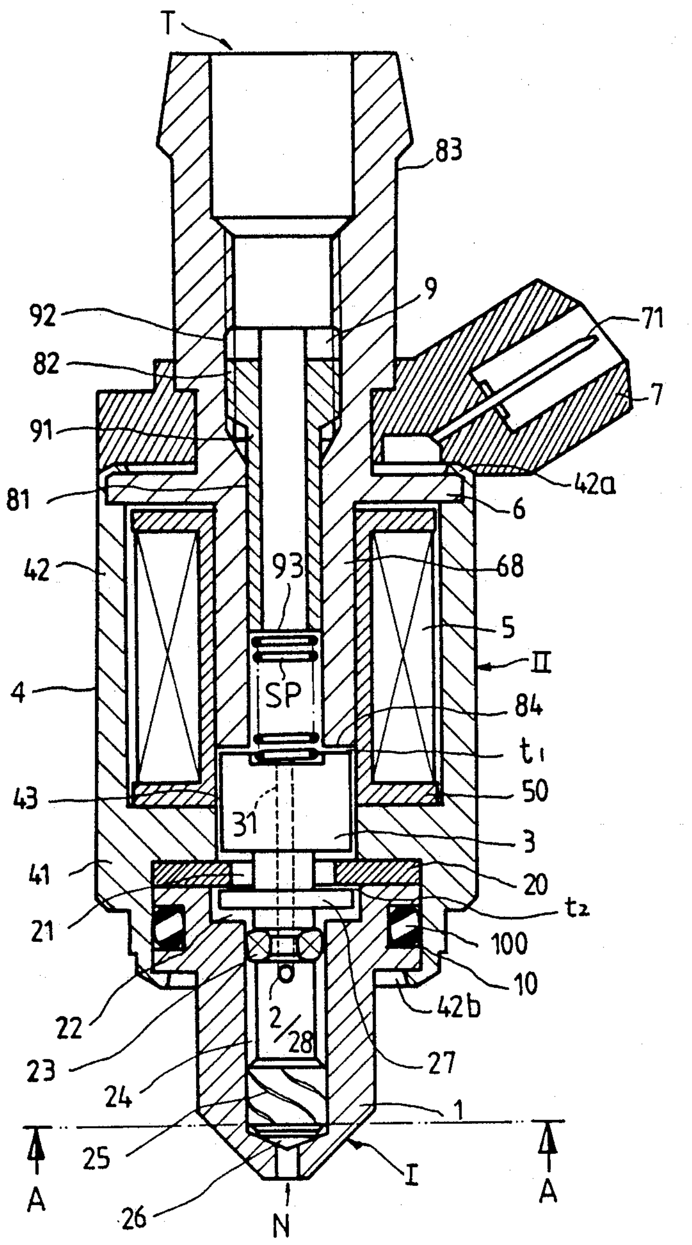
FIG. 1 is a sectional view of a preferred embodiment of a mini type fuel injector according to the present invention.

For purposes of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the fuel injector according to the present invention mainly comprises an electro-magnetic set I and an injecting valve set II. The electro-magnetic set I has a coil 5 which is wrapped round a bobbin 50. The two ends of the coil 5 are connected to a terminal 71 of a socket 7 so as to control the input signal. The coil set including the coil 5 an the bobbin 50 is disposed within a housing 4 which may be immersed into gasoline and the housing 4 is made of magnetically annealed material of high magnetic permeability such as ferro-nickel ferro-silicon alloy . . . etc. which acts as both a part of the magnetic circuit and a major component part of the whole construction. The lower part 41 of the housing 4 is connected to the injecting valve set II while the upper part 42 thereof is joined to the flange 6 of a stator and the connection may be conveniently accomplished by rivetting portions 42*a* and 42*b*. Between the housing 4 and the flange 6 there is pointed a film of leak-proof resin. The rivetting portion 42*a* is pressed to fit on the flange 6 and the socket 7 is fixedly arranged on the flange 6 thereby omitting the mounting of an oil ring and therefore reducing the length of the magnetic flux path and simplifying the structure. The flange 6 is provided with a tubular portion 68 which is the main part of the magnetic flux path and is made of high magnetic permeability material. The tubular portion 68 has a hole 81 slidably fitted with the outer surface 91 of a spring adjusting pipe 9 and is connected together by means of the engagement of threads 82 and 92 so that they can be twisted with respect with each other so as to regulate the adjusting pipe 9. Consequently, the compression of a spring SP disposed between the lower end 93 thereof and an armature 3 can be regulated to adjust the dynamic response of the armature 3. The top end T of the member has a gasoline pipe connection 83 which may be connected with a gasoline pipe for the passage of gasoline. The armature 3 is mounted in a cavity 43 formed between the bobbin 50 and the housing 4 and kept in a clearance from the cavity 43 thus enabling the armature 3 to move freely when subjected to the attraction or release of the coil 5.

The injecting valve set II is consisted of a valve body 1 and a valve needle 2. The valve body 1 and the housing 4 are rigidly connected together and have a groove 10 and a oil ring 100 between them for sealing. The valve body body 1 is formed at the center with a hole for enabling the valve needle 2 to move therein. The lower end of the valve needle 2 is tightly fitted with the armature 3 which has a gasoline passage 31 for letting gasoline pass through the hole 28 at the top of the valve needle 2. The circumference of the valve needle 2 and the valve body 1 are provide with gasoline paths 21,22,23, 24 and spiral gasoline paths 25 and valve seat 26. Hence, when the valve needle 2 together with the armature 3 is moved to open the outlet valve seat 26, the gasoline will be injected out in atomized form through the compressed spring SP, the adjusting pipe 9 and the top end T.

Between the armature 3 and the lower end 84 of the stator member there is a gap t1, which is about 0.09–0.13 mm in distance. A C-shaped washer 20 is disposed between the housing 4 and the valve body 1 for adjusting the valve needle lift t2. t2 is about 0.06–0.08 mm. As the valve needle 2 is attracted to move in unison with the armature 3 by the magnetic force of the coil 5, the flange 27 of the valve needle 2 will be stopped by the C-shaped washer 20 (since gap t2 is shorter than gap t1). When the electro-nagnetic force disappeared, the valve needle 2 will go back to its original position via the resilient force of the compression spring SP and the conic surface 25*a* of the valve needle 2 will again engage tightly with the valve seat 26 of the injecting opening N so that no more fuel will be injected outwards.

Figure 2:
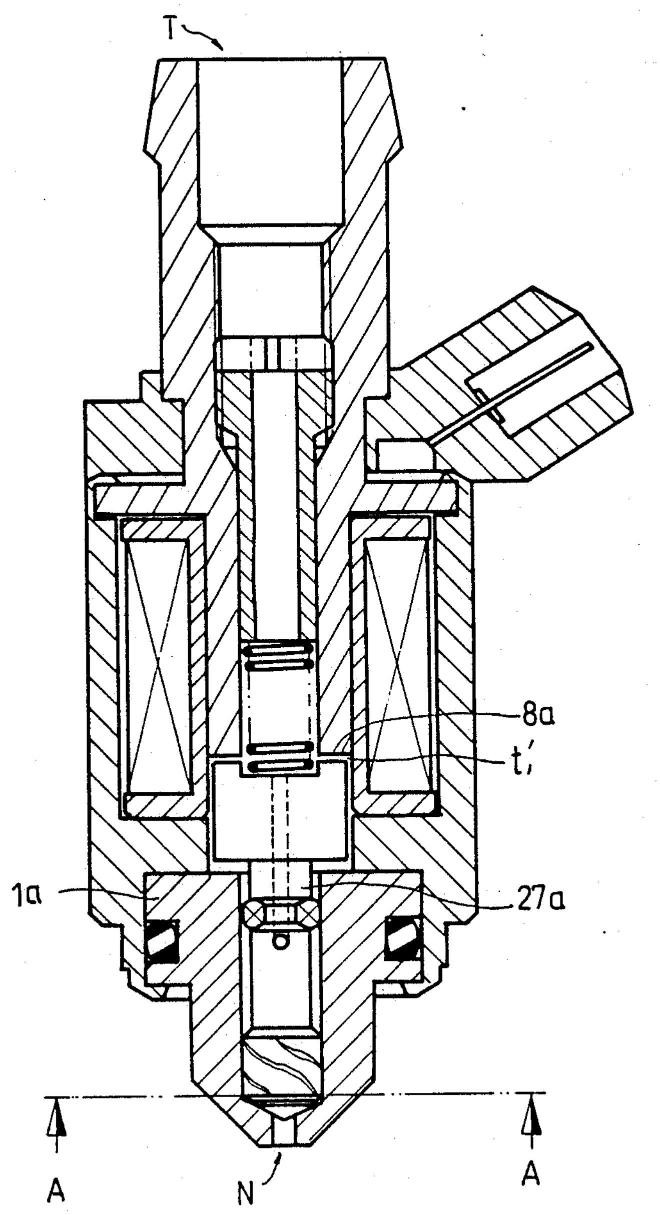
FIG. 2 is a sectional view of another preferred embodiment according to the present invention.

Looking now at FIG. 2, there is shown another preferred embodiment of the present invention. As may be seen, the flange 27 of the valve needle is changed to a cylindrical valve rod 27*a* thereby reducing the weight. Moreover, the C-shaped washer 5 is omitted but the inner end of the valve needle 2 is still in close fit with the armature 3 and so the armature 3 will directly contact the lower end 84 of the stator when subjected to the attraction of the coil 5. The lower end of the stator is electro-plated with a 0.01–0.08 mm layer 8*a*. The original gap t1 is reduced to T'1=0.02–0.04 mm. Since the layer of the low magnetic permeability 8*a* is approximately equal to that of the air, the total gap T is equal to the sum of the thickness of the layer 8*a* and the gap t'1 which is 0.03–0.12 mm, slightly less than the original gap t1. Meanwhile, the actual valve needle lift is shorter than the original one t2. Thus, the design of direct impact between the valve needle and lower end 84 of the stator may speed up the dynamic response of the injector hencing providing higher capabilities thereof.

Figure 3:
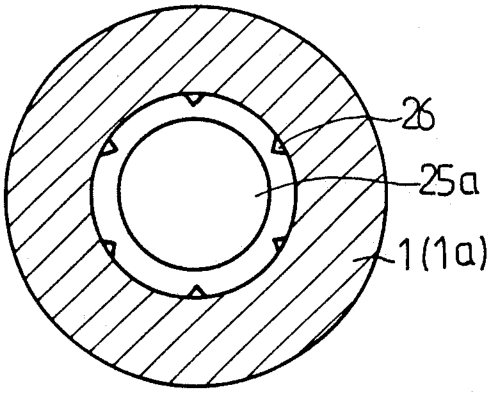
FIG. 3 is a sectional view taken along line A—A of FIGS. 1 and 2.

FIG. 3 shows the design of the spiral grooves of the present invention. As illustrated, the valve needle 2 is formed with a plurality of spiral gasoline grooves 25. At the time when the valve needle 2 is attracted to leave the body 1 or 1*a*, the gasoline will well out of the conic surface 25*a* through the spiral grooves 25, then the gasoline streams will be broken by impacting one another between the valve opening 26 and the gasoline outlet N and injected out of the gasoline outlet N to mix with air and providing very well atomizing effect.

Although this invention has been described with a certain degree of particularity, it is understood that the present disclosure is made by way of example only and that numerous changes in the construction and the combination and arrangement of parts may be resorted to without departing form the spirit and scope of the invention as hereinafter claimed.

I claim:

1. A mini type fuel injector comprising:

a stator having on the outer surface a flange dividing the stator into a first portion and a second portion, said first portion being for connecting a gasoline pipe while said second portion having a flat end and a hole provided with internal threads;

an adjusting pipe slidably disposed within the hole of the second portion of the stator and having a through hole, said adjusting pipe being provided with external threads adapted to the internal threads of the stator so that the adjusting pipe and the stator may be regulated in relative position;

a bobbin disposed on the second portion of said stator member with one end bearing against the flange and the other end extending out of the second portion and wrapped with insulated wires to form a coil;

a housing having an inner reduced neck supporting a lower end of the coil and joined together with the stator by rivetting thereby only forming an opening between a lower end of the second portion and the neck of the housing;

a socket rigidly mounted on the flange of the stator and the housing and having a terminal connected with two ends of the coil so as to control input of signals, said socket being in contiguous contact with said flange for reducing the length of a magnetic flux path;

a cylindrical armature accommodated in a cavity formed between the lower end of the stator, the bobbin and the neck of the housing and having a center through hole for enabling gasoline to flow through said stator and said adjusting pipe;

a valve body having a flange for connecting the housing by rivetting and a through hole converging to a smaller injecting hole;

a valve needle slidably fitted into a valve body with one end fixedly connected with said armature and having a control hole in communication with the hole of said armature thus forming a gasoline path, said needle further having at the middle portion a reduced portion on which there is a gasoline outlet connected with said gasoline path so that gasoline may flow out through a space formed between the reduced portion and the hole of the valve body, the other end of said valve needle being provided with a plurality of spiral grooves so as to limit gasoline flow rate and forming a whirlpool action, said valve needle further having a conical end adapted to the hole of the valve body so that when the valve needle together with the armature is attracted to move towards the lower end of the stator, gasoline will flow through the gasoline path, the space and the spiral groove and then inject out thereof; and, a compression spring with two ends thereof urging against said adjusting pipe and said armature so as to close the valve.

2. A mini type fuel injector as claimed in claim 1, wherein the stator is electroplated with a hard metal layer of low magnetic permeability metal and the stroke of the valve needle is limited by a distance between the armature and the metal layer.

3. A mini type fuel injector as claimed in claim 1, wherein the rivetting between the flange of said stator and said housing is sealed with leak-proof substance then injecting plastic to seal completely and form terminal socket.

* * * * *